United States Patent [19]

Fedida et al.

[11] 4,193,121

[45] Mar. 11, 1980

[54] INFORMATION HANDLING APPARATUS HAVING MULTIPLE PORTS DISTRIBUTED AROUND SHIFTING REGISTER RINGS

[75] Inventors: Samuel Fedida; Desmond J. Sargent, both of Felixstowe, England

[73] Assignee: Post Office, London, England

[21] Appl. No.: 814,921

[22] Filed: Jul. 12, 1977

[30] Foreign Application Priority Data

Jul. 16, 1976 [GB] United Kingdom ............... 29739/76

[51] Int. Cl.² ......................... G06F 13/02; G06F 3/00
[52] U.S. Cl. ........................................ 364/900; 365/78
[58] Field of Search ........................................ 365/78; 364/900 MS File, 200

[56] References Cited

U.S. PATENT DOCUMENTS

| | | | |
|---|---|---|---|
| 3,501,746 | 3/1970 | Vosbury | 364/900 |
| 3,713,096 | 1/1973 | Comfort | 364/200 |
| 3,735,362 | 5/1973 | Ashany | 364/200 |
| 3,748,647 | 7/1973 | Ashany | 364/200 |
| 3,967,263 | 6/1976 | Chang | 364/900 |
| 4,027,288 | 5/1977 | Barton | 364/200 |
| 4,064,556 | 12/1977 | Edelberg | 364/900 |
| 4,065,756 | 12/1977 | Danigrahi | 365/78 |

Primary Examiner—James D. Thomas
Attorney, Agent, or Firm—Hall & Houghton

[57] ABSTRACT

An information handling apparatus capable of having a large number of input/output ports includes a plurality of independent processors connected to respective positions around a plurality of closed rings of shifting registers arranged in parallel which form the main storage medium for the apparatus.

7 Claims, 1 Drawing Figure

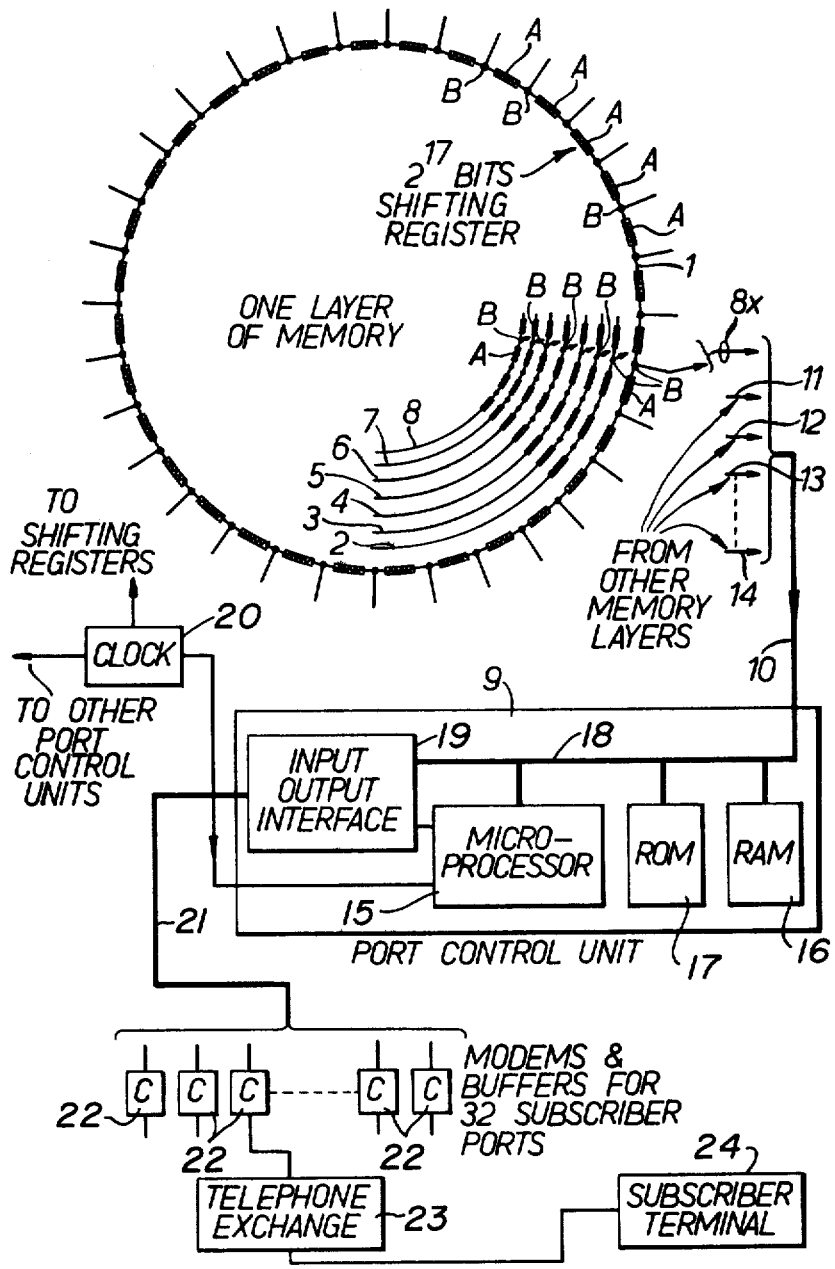

INFORMATION HANDLING APPARATUS HAVING MULTIPLE PORTS DISTRIBUTED AROUND SHIFTING REGISTER RINGS

This invention relates to information handling apparatus suitable for use in a computer based information system in which a large pool of information is accessible to subscribers via the public telephone system, selected items of information being displayed to a subscriber on a television type screen. One such information system which has been proposed in known as VIEWDATA.

In the VIEWDATA system subscribers are provided with a key pad by means of which they can obtain access to information stored in a computer at a remote point via the public telephone network, the information being supplied to the subscriber in coded form to be decoded and displayed on a television type screen as a "page" of information. In the VIEWDATA system particular care has been taken to ensure that the entries required by the subscriber are simple ones, for example being based on indices more or less automatically provided by the computer.

In such a system it is envisaged that a large pool of information be rapidly accessible to the subscriber from a computer serving an area containing, for example, 1,000 subscribers. In order to keep the access time for any item of information down to a reasonably short period, for example, of the order of 5 seconds, it is necessary that the computer in which the information is stored be capable of a high speed of operation. One way of achieving this result would be to utilise a large data processing computer, because it would have the capability of the required high speed of operation, although it would also provide a facility for very rapid and complex data processing which would not be required by the system. Another disadvantage of such a computer in the VIEWDATA system would be its relatively low reliability because of its complexity and it would also be extremely expensive.

Another solution to the problem would be to use general purpose mini-computers in which the storage would be provided on magnetic discs. This solution would also have the disadvantage of providing a high speed of data processing which would not be required but would have to be paid for both in cost and low reliabilty, and would also suffer from the disadvantage that the moving parts associated with the disc memories would be liable to wear. The solution to the problem adopted in accordance with the present invention is the construction of a special purpose computer providing the large volume of storage required and a minimum of data processing facilities.

According to the present invention there is provided an information handling apparatus including a plurality of ports for receiving input signals and transmitting corresponding output signals, a plurality of port control units to each of which is connected at least one of said ports, and information storage means connected to all of the port control units, the information storage means including at least one closed ring of shifting register stages round which in use information is continuously recirculated, the port control units being connected to respective different points around the ring.

The information storage means may include a group of closed rings of shifting register stages having the same number of stages in which the information is stored in bytes consisting of a group of binary digits, the digits of a byte being stored in respective rings of the group so as to be applied in parallel to each of the port control units. The information storage units may consist of a plurality of such groups of closed rings of shifting registers.

An information handling apparatus according to the invention is of particular value in a VIEWDATA system as described above because the information stored in the apparatus is available at a relatively large number of outlets more or less at the same time, but the processing of which the apparatus is capable may be limited so that the cost and complexity of a large data processor which will otherwise be needed to meet the requirements of the system could be avoided. The processing required by the VIEWDATA system could be provided in the apparatus according to the invention by a commercially available microprocessor and its associated components in each of the port control units. A suitable circuit for a port control unit is shown in FIG. 4 of an article entitled "Commonality in microcomputer system design" by Phil Pittman, published in "New Electronics" for the May 4, 1976 which refers to the well known Intel 8080 microprocessor system. Special programmes may be provided to enable the microprocessor to perform other information processing functions which would provide, for example, a game playing or simple calculation facility in the port control units.

In order that the invention may be fully understood and readily carried into effect it will now be described with reference to the single FIGURE of the accompanying drawing which shows in diagrammatic form one example of the apparatus according to the invention.

Referring to the drawing, the information storage means shown consists of several layers of memory each consisting of eight concentric rings of shifting register stages. In the drawing only one ring 1 is shown completely, parts only being shown of rings 2, 3, 4, 5, 6, 7 and 8 which complete with the ring 1 a layer of memory. The rings 1 to 8 are all of the same construction and each contains 32 shifting registers A of integrated circuit construction in which the output of each integrated circuit is connected to the input of the next. A connection is made to the junction B between each adjacent pair of shifting registers A for connection of the ring to a port control unit. In the drawing only one port control unit 9 is shown having a multiple connection 10 by means of which it is connected to corresponding junctions B of the rings 1 to 8. There could be up to 32 port control unit like the unit 8. A group of eight digits, termed a byte, circulates in parallel round the eight rings 1 to 8, so that the digits forming a byte are presented in parallel to the conductors 10 of the port control unit 9. Connections 11, 12, 13 and 13 are shown for connecting other layers of memory to the port control unit 9. The port control unit 9 contains a microprocessor 15 connected to a RAM 16 and a ROM 17 via a buss bar system 18, and an input/output interface 19 connected to the buss bar system 18 and also directly to the microprocessor 15. The microprocessor 15 receives clock signals from a clock 20 common to all of the port control units, which clock also provides the shifting pulses driving the shifting register memory. The ROM 17 is provided for storing special programmes to enable the port contol unit 9 to effect certain data processing operations additional to the selection of data from the multi-layer shifting register memory just described. Input signals to the control unit 9 and output signals from it are fed through the interface 19 along a multiple output connection 21 to modems and buffers for subscriber ports represented by the blocks C, each bearing the reference number 22. Each of the blocks C is connectible through the telephone exchange 23 to a telephone line to a subscriber terminal 24. There may be up to 32 subscriber ports connected to each port control unit.

In the example of the invention being described, each of the shifting registers A contains $2^{17}$ stages, and these shifting registers may be constructed in integrated circuit form as a CCD or magnetic bubble memory, for example. It will be apparent therefore that the complete ring 1 of shifting register stages contains $2^{22}$ or just over 4 million stages. As the clock rate is 2.097 MHz the circulation time for data in the rings is about 2 seconds. In the VIEWDATA system $2^{10}$ or 1024 bytes constitutes a "page" of data to be individually addressed and transmitted to a subscriber. Thus each layer of the memory contains 4096 pages of data and if 16 such layers are available, then 65,536 pages of information can be provided.

As there are 32 junctions B in each of the shifting register rings, there can be upto 32 port control units associated with the rings, and if each of these is arranged to handle the enquiries from 32 subscribers then the apparatus will be able to handle 1,024 enquiries simultaneously. Since the circulation time of the shifting register rings is 2 seconds, the maximum time required to find any particular page is also 2 seconds and the average time is 1 second.

In the port control unit 9 the microprocessor 15 is programmed to scan the 32 subscriber ports via the interface 19 to locate input signals therefrom and carry out the processing required by the input signals. The processing will usually involve the selection of a particular page of information from the memory, and this could be achieved by selecting the appropriate layer of the memory and the transferring data from that layer into the RAM 16 at the time corresponding to the page required, and then transferring the data from the RAM 16 to the buffer of the correct subscriber port. Alternatively the data could be transferred directly from the memory to the subscriber port buffer, in which case the RAM 16 could be made smaller than if it were used for intermediate storage of the data.

The port control unit 9 could also provide calculation and/or game playing facilities, in which case suitable programmes would be stored in the ROM 17 and the RAM 16 would have the capacity necessary for the functions demanded of it by these programmes. As an alternative, it would be possible for the additional programmes to be stored separately in a unit accessible to some or all of the port control units, and either used directly from that unit or transferred to the RAM 16 of a port control unit and used from that.

What we claim is:

1. An information handling apparatus including a plurality of ports, each for receiving input signals and transmitting corresponding output signals, a plurality of port control units, each of which is connected to at least one of said ports, and information storage means connected to all of the port control units, the information storage means including several pluralities of closed rings formed of groups of shifting register stages connected in series, each ring having the same number of stages and having a plurality of junctions at which the last stage of one group of shifting register stages is connected directly to the first stage of the next group of shifting register stages around the particular ring, the port control units being connected directly to respective corresponding junctions in each plurality of rings, and stepping means for synchronously and continuously recirculating information around the rings, the information consisting of groups of digits, the digits of each group being respectively stored in the rings of a plurality of rings and propagated in parallel by the stepping means so as to appear in parallel at corresponding junctions of the particular plurality of rings, and each port control unit being connected to the stepping means and to all of the rings and including means enabling it to read a selected group of digits in parallel by accessing the corresponding junctions on the rings at an instant associated with the selected group of digits, and by selecting one of the pluralities from among the several pluralities.

2. Apparatus according to claim 1 wherein in each of the rings of shifting register stages, the groups of stages between the junctions to which the port control units are connected include the same number of stages and each group of stages is constructed as an integrated circuit.

3. Apparatus according to claim 1, wherein the port control units are substantially uniformly spaced around the rings.

4. Apparatus according to claim 1, wherein each port control unit includes data processing means arranged to respond to input signals to select items of information specified in the input signals from the information storage means and transmit them as output signals.

5. Apparatus according to claim 4 wherein the data processing means includes a microprocessor.

6. Apparatus according to claim 5 wherein the data processing means is arranged to perform calculations in response to the input signals.

7. Apparatus according to claim 1 wherein each port control unit is connected to buffer means for a plurality of ports.

* * * * *